(12) United States Patent
Betensky

(10) Patent No.: US 7,457,050 B2
(45) Date of Patent: Nov. 25, 2008

(54) ZOOM LENS SYSTEM FOR USE WITH SMALL ELECTRONIC SENSOR

(75) Inventor: Ellis Betensky, Ottawa (CA)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 11/690,693

(22) Filed: Mar. 23, 2007

(65) Prior Publication Data

US 2007/0223102 A1   Sep. 27, 2007

Related U.S. Application Data

(60) Provisional application No. 60/743,767, filed on Mar. 24, 2006.

(51) Int. Cl.
*G02B 15/14* (2006.01)
(52) U.S. Cl. .................. 359/691; 359/680; 359/682; 359/689
(58) Field of Classification Search .......... 359/680, 359/682, 689, 691
See application file for complete search history.

(56) References Cited

U.S. PATENT DOCUMENTS

| | | | | |
|---|---|---|---|---|
| 4,993,814 A | * | 2/1991 | Hata | 359/691 |
| 5,446,592 A | * | 8/1995 | Kohno et al. | 359/689 |
| 6,169,635 B1 | * | 1/2001 | Ozaki et al. | 359/691 |
| 6,191,896 B1 | * | 2/2001 | Itoh | 359/689 |
| 6,992,835 B2 | | 1/2006 | Iwasawa et al. | |
| 6,995,924 B2 | | 2/2006 | Sato | |
| 7,006,300 B2 | | 2/2006 | Shinohara | |
| 7,019,912 B2 | | 3/2006 | Saori | |
| 7,061,685 B2 | | 6/2006 | Itoh | |
| 7,085,068 B2 | | 8/2006 | Noda | |
| 2005/0231817 A1 | * | 10/2005 | Matsusaka et al. | 359/680 |
| 2005/0286138 A1 | * | 12/2005 | Matsusaka | 359/680 |

FOREIGN PATENT DOCUMENTS

| | | | | |
|---|---|---|---|---|
| JP | 01183616 A | * | 7/1989 | |
| JP | 2005292403 A | * | 10/2005 | |
| JP | 2006011096 A | * | 1/2006 | |

* cited by examiner

*Primary Examiner*—Scott J. Sugarman
*Assistant Examiner*—James R Greece
(74) *Attorney, Agent, or Firm*—Robert G. Crouch; Marsh, Fischmann & Breyfogle LLP

(57) ABSTRACT

A five-element 3:1 zoom lens system in which the first lens group has a negative power and includes two lens elements and the second lens group has a positive power and includes a pair of lens sub-groups, the first sub-group having a positive power and including a pair of lens elements and the second sub-group having a positive power and including a single lens element. In one embodiment the second sub-group remains stationary relative to the location of the image plane and in another embodiment the second sub-group remains stationary relative to the first sub-group while they are moved relative to the location of the image plane. Several of the lens element surfaces are aspherical. The second lens element of the first sub-group is relatively thick and has a relatively high optical power. The overall length of the lens system is relatively short.

30 Claims, 2 Drawing Sheets

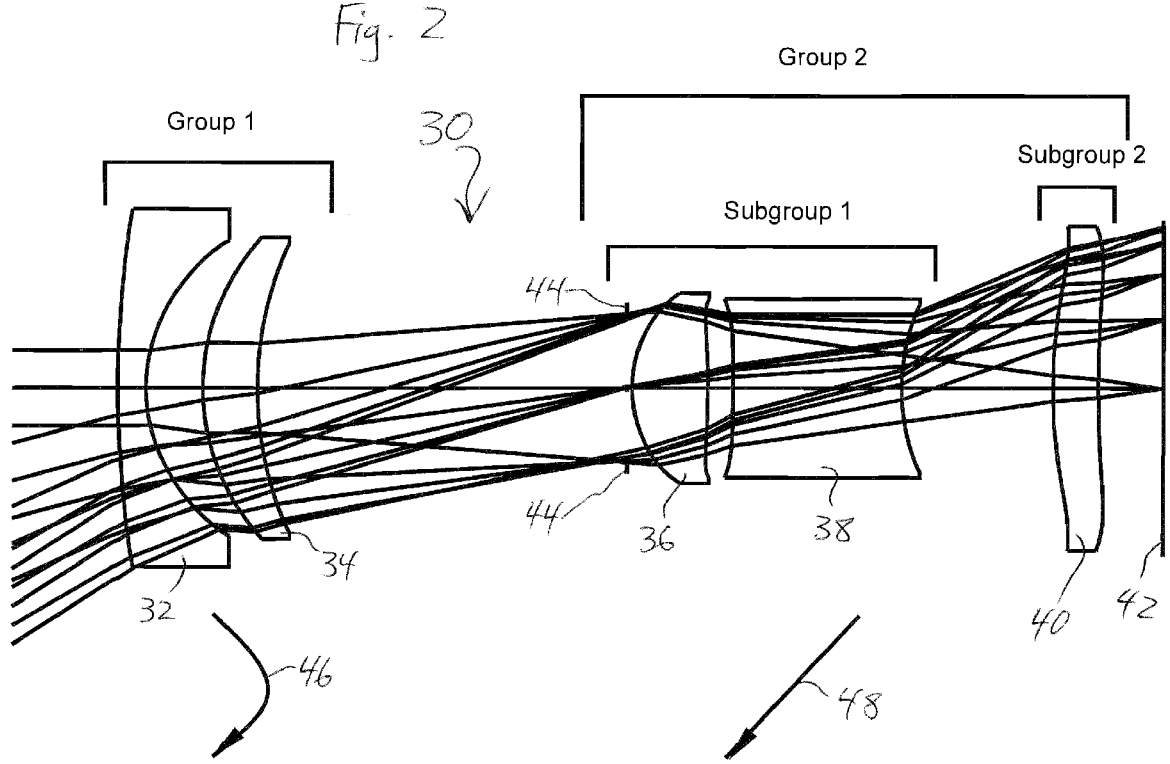

ZOOM LENS SYSTEM FOR USE WITH SMALL ELECTRONIC SENSOR

CROSS REFERENCE TO RELATED APPLICATION

This application claims priority under 35 U.S.C. § 119 to U.S. Provisional Application No.: 60/743,767 entitled "Zoom Lens for Use with Small Electronic Sensor" having a filing date of Mar. 24, 2006, the entire contents of which are incorporated by reference herein.

BACKGROUND

Small electronic imaging devices, such as cameras in cell phones and other small electronic devices, require zoom lens systems that are small in size, inexpensive to manufacture, and have exit pupils consistent with the requirements of the electronic sensor.

Conventional two-lens-group zoom lens systems have a negative first group that moves for compensation and focusing, and a positive second group that moves to effect a magnification change. They are sometimes referred to as np-type zoom lens systems.

While such np-type zoom lens systems are inexpensive, the leading negative group does not allow for compact size, and the positive group yields an exit pupil position too close to the image for the sensor to function properly. As a result, the current lens systems are larger than desired. Typically the first zooming group in such np-type zoom lens systems has included three or more separate lens elements and the second zooming group in such np-type zoom lens systems has included four or more separate lens elements, for a total lens element count of seven or more.

While other five-element zoom lens systems have been proposed, they are all believed to suffer from one or more of the drawbacks of large size, undesirable exit pupil position, insufficient zoom range.

It would be desirable to provide a zoom lens system design that is very inexpensive, is easily manufactured, has a sufficient zoom range and desirable exit pupil position, and is small enough and of sufficient optical quality/resolution to be used in small electronic cameras.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

A zoom lens system includes a first lens group having a negative power and including two lens elements and a second lens group having a positive power and including three lens elements. The three lens elements of the second lens group have a first lens element having a positive power, a second lens element having a negative power, and a third lens element having a positive power. The first and second lens elements of the second lens group form a first sub-group and the first sub-group has a first principal point (PP1) and an effective focal length (f) such that the absolute value of PP1 divided by f is in the range of approximately 0.4 to 0.75. The first lens group can be moved relative to the second lens group to move through a range of focal lengths to achieve a zoom ratio of at least approximately 2.8.

The first lens group may include a first lens element having a positive power and a second lens element having a negative power. The first and second lens elements of the second lens group may provide a telephoto effect. The length from the first surface of the first lens element of the first lens group may be spaced apart from the location of the image formed by the zoom lens system by a distance less than five times or less than 4.1 times the shortest focal length of the system.

The zoom lens system may form an image for an electronic image sensor that has an active area whose size can be represented by a diagonal thereof, wherein the length from the first surface of the first lens element of the first lens group may be spaced apart from the image formed by the zoom lens system by a distance less than four times or 3.4 times the diagonal of the active area of the electronic image sensor.

The third lens element in the second lens group may remain stationary relative to the location of the image formed by the zoom lens system when the focal length of the system is varied. The third lens element in the second lens group may remain stationary relative to the second lens element in the second lens group when the focal length of the system is varied.

One or more of the lens elements in the zoom lens system may be composed of glass. One or more of the lens elements in the zoom lens system may be composed of a molded plastic. One or more of the lens elements in the zoom lens system may have an aspheric surface.

The first and second lens elements of the second lens group may form a first sub-group and the first sub-group may have an effective focal length between 1.0 and 1.5. The second lens element in the second lens group may have a thickness of at least 0.6 times, 0.9 times, or 0.94 times the shortest focal length of the system.

According to another aspect, a zoom lens system includes a first lens group having a negative power and including two lens elements and a second lens group having a positive power and including three lens elements. The three lens elements have a first lens element having a positive power, a second lens element having a negative power, and a third lens element having a positive power. The first and second lens elements of the second lens group form a first sub-group and the first sub-group has an effective focal length between 1.0 and 1.5. The first lens group can be moved relative to the second lens group to move through a range of focal lengths to achieve a zoom ratio of at least approximately 2.8.

The first and second lens elements of the second lens group may form a first sub-group and the first sub-group may have a first principal point (PP1) and an effective focal length (f) such that the absolute value of PP1 divided by f is between 0.4 and 0.75.

According to another aspect, a zoom lens system includes a first lens group having a negative power and including two lens elements and a second lens group having a positive power and including three lens elements. The three lens elements have a first lens element having a positive power, a second lens element having a negative power, and a third lens element having a positive power. The second lens element has a thickness of at least 0.6 times the shortest focal length of the system. The first lens group can be moved relative to the second lens group to move through a range of focal lengths to achieve a zoom ratio of at least approximately 2.8.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

FIG. 2 is a cross-sectional view of a second embodiment of a zoom lens system.

DETAILED DESCRIPTION

Figure 1:
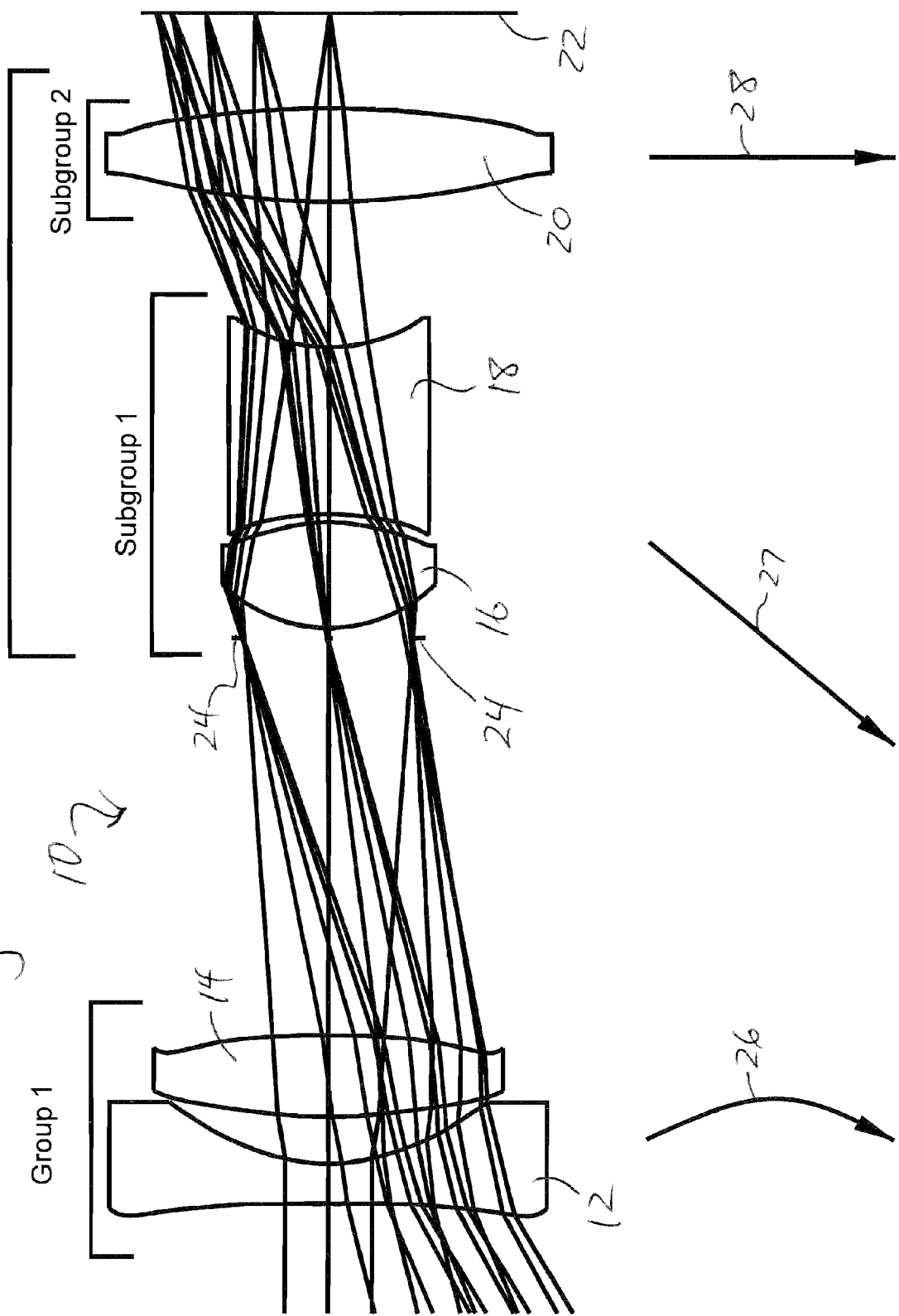
FIG. 1 is a cross-sectional view of a zoom lens system.

Reference will now be made to the accompanying drawings, which assist in illustrating the various pertinent features of the present invention. Although the present invention will now be described primarily in conjunction with zoom lens systems for small electronic imaging devices, it should be expressly understood that the present invention may be applicable to other applications where it is desired to minimize the size of a zoom lens system. In this regard, the following description of a zoom lens system for small electronic imaging devices is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

A zoom lens system 10 is shown in FIG. 1. As can be seen, there is a first lens group (Group 1) that includes a first lens element 12 and a second lens element 14. Throughout this description, it is assumed that the subject side or front of the lens system is to the left as viewing FIG. 1, while the image side or back of the lens system is to the right as viewing FIG. 1. There is also a second lens group (Group 2) that includes two sub-groups, Sub-group 1 and Sub-group 2. Sub-group 1 includes a first lens element 16 and a second lens element 18. A third lens element 20 in Group 2 is the only lens element in Sub-group 2. The image is formed at an image plane 22, where the electronic image sensor (e.g., CMOS, CCD, or other suitable type) may be located. There may also be an aperture stop 24 between Group 1 and Group 2.

Group 1 has a negative optical power, while Group 2 has a positive optical power. Thus, the system 10 is an np-type zoom lens system. Further, both Sub-group 1 and Sub-group 2 of Group 2 have a positive optical power. As to the individual lens elements, lens elements 14, 16, and 20 have a positive power, while lens elements 12 and 18 have a negative optical power.

Lens element data for system 10 can be found in the data sheet below.

EXAMPLE 1

$f' = 3.7\sim10.3$

| SRF | RADIUS | THICKNESS | APERTURE RADIUS | GLASS |
|---|---|---|---|---|
| 1 | 27.251658 | 0.500000 | 2.750000 | MLAL13 M * |
| 2 | 2.195675 | 0.593834 | 2.000000 | AIR * |
| 3 | 6.650304 | 1.023514 | 2.200000 | CARBO C * |
| 4 | −13.657891 | 4.973434 | 2.200000 | AIR * |
| 5 | Aperture stop | 0.128364 | 1.060808 | AIR |
| 6 | 1.912976 | 1.325050 | 1.341300 | MBSC7 M |
| 7 | −2.126735 | 0.099915 | 1.262400 | AIR * |
| 8 | −3.712098 | 2.099363 | 1.262400 | MTIM28 M * |
| 9 | 2.159896 | 1.814172 | 1.183500 | AIR * |
| 10 | 8.834215 | 1.170677 | 2.800000 | CARBO C * |
| 11 | −11.052470 | 1.192601 | 2.600000 | AIR * |

*CONIC AND POLYNOMIAL ASPHERIC DATA

| SRF | CC | AD | AE | AF | AG |
|---|---|---|---|---|---|
| 1 | — | −3.4716e−02 | 1.2618e−02 | −2.1838e−03 | 1.4046e−04 |
| 2 | — | −5.4527e−02 | 1.7071e−02 | −2.6274e−03 | −5.9857e−05 |
| 3 | — | −6.3854e−03 | 4.8678e−04 | −2.3406e−04 | 6.7575e−05 |
| 7 | — | 9.8753e−02 | −5.1732e−02 | 1.4521e−02 | −7.9775e−04 |
| 8 | — | 2.9922e−02 | −3.4724e−02 | −4.0544e−03 | 5.2122e−03 |
| 9 | −2.6423e+00 | 2.0247e−02 | 1.1890e−02 | −9.1823e−03 | 6.9617e−03 |
| 10 | — | −2.8056e−03 | 6.4230e−04 | −1.8113e−05 | −5.6384e−06 |

* SYMMETRIC GENERAL ASPHERE SURFACE DATA

| 4 | AS2 | −3.6651e−03 | AS3 | −1.9710e−03 | AS4 | 3.1326e−04 | AS5 | 2.3125e−05 |
|---|---|---|---|---|---|---|---|---|
|   | AS6 | −2.5115e−05 | AS7 | 6.7200e−06 | | | | |

-continued

| 11 | AS2 | 1.9780e−03 | AS3 | −2.1014e−04 | AS4 | 6.8075e−06 | AS5 | 8.3629e−06 |
|----|-----|------------|-----|-------------|-----|------------|-----|------------|
|    | AS6 | −3.2499e−06 | AS7 | 2.1820e−07 | | | | |

| *WAVELENGTHS: | 0.546100 | 0.480000 | 0.643800 |
|---|---|---|---|

*REFRACTIVE INDICES

| SRF | GLASS | RN1 | RN2 | RN3 | VNBR |
|-----|-------|-----|-----|-----|------|
| 1 | MLAL13 | 1.693150 | 1.699919 | 1.686738 | 52.590000 |
| 3 | CARBO | 1.590088 | 1.600365 | 1.580754 | 30.090095 |
| 6 | MBSC7 | 1.516610 | 1.520677 | 1.512658 | 64.420000 |
| 8 | MTIM28 | 1.688240 | 1.699757 | 1.677818 | 31.370000 |

| CFG | EFL | IMAGE DISTANCE | f/# | IMAGE HEIGHT | FIELD ANGLE |
|-----|-----|----------------|-----|--------------|-------------|
| 1 | 3.7471 | 1.1957 | 3.4000 | 2.2509 | 30.9835 |
| 2 | 7.0962 | 1.1976 | 4.7500 | 2.2546 | 17.5922 |
| 3 | 10.3080 | 1.1931 | 6.0000 | 2.2508 | 12.3132 |

SRF represents lens element surface numbers, starting with the first (leftmost) surface of lens element 12 in FIG. 1 and progressing toward the image plane 22. RADIUS is the radius of curvature at the lens surface vertex. THICKNESS is the distance between lens surface vertices. APERTURE RADIUS is the radius of the optical clear aperture measured from the surface vertex at the optical axis. GLASS is the designation of the optical material by the manufacturers. CONIC AND POLYNOMIAL ASPHERIC DATA—lens surfaces with a * are aspherical according to the standard polynomial description with coefficients shown (refer to the OSLO program provided by Lambda Research Corporation). WAVELENGTHS—representative wavelength of light in microns used in calculations and specified respectively for each material as RN1, etc. CFG is the zoom lens configuration number as shown for representative focal lengths (EFL). IMAGE DISTANCE is the distance from the last lens surface vertex to the image plane. f/# is the relative aperture at the image plane. IMAGE HEIGHT is half of the image diagonal, so the image diagonal is twice the image height. FIELD ANGLE is the angle subtended by the object measured from the optical axis to the corner of the object. This system 10 can be varied in focal length from approximately 3.7 to approximately 10.3, thus achieving a zoom range of 2.8 to 1 or roughly 3 to 1.

The effective focal length of Group 1 is −2.065, the effective focal length of Sub-group 1 is 1.206, and the effective focal length of Sub-group 2 is 2.270. The first principal point (PP1) of Sub-group 1 is −0.749. The absolute value of PP1 for Sub-group 1 divided by the focal length of Sub-group 1 is 0.621.

The two lens elements 12 and 14 of Group 1 have opposite optical powers to provide for color correction of the system 10. Sub-group 1 of Group 2 also has lens elements (16 and 18) with opposite optical powers to provide for color correction of the system 10.

As can be seen, Sub-group 1 has a strong negative surface (on lens element 18) closet to the image plane 22 and Sub-group 2 is separated from Sub-group 1, in part to extend the distance to the exit pupil.

The strong negative surface power of Sub-group 1 provides a telephoto effect, thus minimizing the total lens system length. By telephoto effect we mean that the length of the lens group is shorter than the focal length of the lens group.

Because of the negative power and attendant contribution to Petzval curvature of Sub-group 1, Sub-group 2 can be added to provide for the desired exit pupil position while still maintaining a flat image surface.

This system 10 allows for the potential manufacture of the least expensive 3:1 zoom lens system for use with small electronic sensors. It is believed that each of the five lens elements performs a function that cannot be eliminated or combined with another lens element to thus reduce the total number of lens elements required.

The lens groups can be moved relative to each other (to change the focal length of the system 10) in conventional manners that are well known to those having experience in designing zoom lens systems. In this lens system 10, Sub-group 2 is kept stationary relative to the image plane 22, so that Sub-group 1 moves relative to Sub-group 2 as the focal length of the system 10 is varied. These possible relative movements are indicated in FIG. 1 by arrows 26, 27, and 28, where arrow 26 indicates that Group 1 may be moved toward the image plane 22 and then back away from the image plane 22 as the overall focal length of the lens system 10 is varied from its smallest to its largest focal length, arrow 27 indicates that Sub-group 1 may be moved away from the image plane 22 as the overall focal length of the lens system 10 is varied from its smallest to its largest focal length, and arrow 28 indicates that Sub-group 2 remains stationary relative to the image plane 22 as the overall focal length of the lens system 10 is varied from its smallest to its largest focal length.

For example, the zoom spacing for space 4 (the distance from the image side of lens element 14 to the aperture stop 24) varies from 4.97 mm to 0.2 mm as the lens system is varied from its shortest to longest focal length. At the same time, space 9 (the distance from the image side of lens element 18 to the object side of lens element 20) varies from 1.81 mm to 6.59 mm as the lens system is varied from its shortest to longest focal length. Of course, space 11 (the space from the image side of lens element 20 to the image plane 22, also known as the image distance) remains essentially constant at 1.19 mm.

The overall length of the zoom lens system 10 is approximately 14.92 mm, which is less than four times and less than 3.4 times (e.g., approximately 3.314 times) the diagonal of the active area of the electronic image sensor and less than five times and less than 4.1 times (e.g., approximately 3.98 times) the shortest focal length of the system. The thickness of Sub-group 1 (including the air space between lens elements 16 and 18) is approximately 3.52 mm or roughly 0.94 times the smallest focal length of the system (3.7471).

A second embodiment is shown in FIG. 2. In this embodiment, a lens system 30 includes a first lens group (Group 1) that includes a first lens element 32 and a second lens element 34. There is also a second lens group (Group 2) that includes two sub-groups, Sub-group 1 and Sub-group 2. Sub-group 1 includes a first lens element 36 and a second lens element 38. A third lens element 40 in Group 2 is the only lens element in Sub-group 2. The image is formed at an image plane 42, where the electronic image sensor (e.g., CMOS, CCD, or other suitable type) may be located. There may also be an aperture stop 44 between Group 1 and Group 2.

Group 1 has a negative optical power, while Group 2 has a positive optical power. Thus, the system 10 is an np-type zoom lens system. Further, both Sub-group 1 and Sub-group 2 of Group 2 have a positive optical power. As to the individual lens elements, lens elements 34, 36, and 40 have a positive power, while lens elements 32 and 38 have a negative optical power.

Lens element data for the lens system 30 can be found in the data sheet below.

EXAMPLE 2 f = 4.65~13.09

| SRF | RADIUS | THICKNESS | APERTURE RADIUS | GLASS |
|---|---|---|---|---|
| 1 | 15.408510 | 0.500000 | 3.200000 | L-LAL13 M * |
| 2 | 2.843804 | 1.022340 | 2.650000 | AIR * |
| 3 | 3.978280 | 0.970200 | 2.700000 | SF18 C |
| 4 | 6.186714 | 6.574008 | 2.600000 | AIR |
| AST | Aperture stop | 0.099961 | 1.328511 | AIR |
| 6 | 2.303228 | 1.351235 | 1.700000 | K-PG325 M * |
| 7 | −10.253478 | 0.435420 | 1.600000 | AIR * |
| 8 | −93.765596 | 3.000001 | 1.600000 | K-PSFN3 M * |
| 9 | 3.921457 | 2.697663 | 1.500000 | AIR * |
| 10 | 9.474970 | 0.800000 | 2.900000 | K-PSFN3 M * |
| 11 | 19.756231 | 1.181955 | 2.900000 | AIR * |

*CONIC AND POLYNOMIAL ASPHERIC DATA

| SRF | CC | AD | AE | AF | AG |
|---|---|---|---|---|---|
| 1 | — | −3.1666e-03 | 5.4155e-04 | −4.6013e-05 | 1.6726e-06 |
| 2 | — | −5.3000e-03 | 3.6574e-04 | −3.3458e-06 | −1.0275e-05 |
| 6 | — | −2.2481e-03 | 6.6565e-03 | −3.3307e-03 | 9.0364e-04 |
| 7 | — | −8.2389e-04 | 2.0042e-02 | −1.3394e-02 | 3.5132e-03 |
| 8 | — | −1.2893e-02 | 7.4453e-03 | −8.1235e-03 | 1.6206e-03 |
| 9 | — | 2.5188e-03 | 2.2924e-03 | −2.1020e-03 | 6.7691e-04 |
| 10 | — | −3.0472e-03 | 1.5759e-03 | −3.2692e-04 | 1.7046e-05 |
| 11 | — | −3.9443e-03 | 1.6869e-03 | −3.3482e-04 | 1.6543e-05 |

*WAVELENGTHS: 0.546100  0.480000  0.643800

*REFRACTIVE INDICES

| SRF | GLASS | RN1 | RN2 | RN3 | VNBR |
|---|---|---|---|---|---|
| 1 | L-LAL13 | 1.694000 | 1.700695 | 1.687650 | 53.200000 |
| 3 | SF18 | 1.727336 | 1.740534 | 1.715481 | 29.031842 |
| 6 | K-PG325 | 1.506700 | 1.510322 | 1.503135 | 70.500000 |
| 8 | K-PSFN3 | 1.839000 | 1.857566 | 1.822467 | 23.904400 |

| CFG | EFL | IMAGE DISTANCE | f/# | IMAGE HEIGHT | FIELD ANGLE |
|---|---|---|---|---|---|
| 1 | 4.6485 | 1.1570 | 3.4000 | 2.9697 | 32.6626 |
| 2 | 8.9870 | 3.9476 | 4.7500 | 2.8869 | 17.7398 |
| 3 | 13.0864 | 6.6005 | 6.0000 | 2.9026 | 12.3907 |

This system 30 can be varied in focal length from approximately 4.65 to approximately 13.09, thus achieving a zoom range of 2.82 to 1, or roughly 3 to 1. In this lens system 30, Sub-group 2 is moved together with Sub-group 1 relative to the image plane 42. These possible relative movements are indicated in FIG. 2 by arrows 46 and 48, where arrow 46 indicates that Group 1 may be moved toward the image plane 42 and then back away from the image plane 42 as the overall focal length of the lens system 30 is varied from its smallest to its largest focal length and arrow 48 indicates that Group 2 may be moved away from the image plane 42 as the overall focal length of the lens system 30 is varied from its smallest to its largest focal length.

For example, the zoom spacing for space 4 (the distance from the image side of lens element 34 to the aperture stop 44) varies from 6.57 mm to 0.2 mm as the lens system is varied from its shortest to longest focal length. At the same time, space 9 (the distance from the image side of lens element 38 to the object side of lens element 40) remains essentially constant at 2.70 mm. Space 11 (the space from the image side of lens element 40 to the image plane 42, also known as the image distance) varies from 1.18 mm to 6.48 mm as the lens system is varied from its shortest to longest focal length.

The overall length of the zoom lens system 30 is approximately 18.63 mm, which is less than four times and less than 3.4 times (e.g., approximately 3.137 times) the diagonal of the active area of the electronic image sensor and less than five times and less than 4.1 times (e.g., approximately 4.01 times) the shortest focal length of the system. The thickness of Sub-group 1 (including the air space between lens elements 36 and 38) is approximately 4.79 mm or roughly 1.03 times the smallest focal length of the system (4.6485).

The effective focal length of Group 1 is −1.840, the effective focal length of Sub-group 1 is 1.107, and the effective focal length of Sub-group 2 is 4.508. The first principal point (PP1) of Sub-group 1 is −0.627. The absolute value of PP1 for Sub-group 1 divided by the focal length of Sub-group 1 is 0.566.

The two lens elements 32 and 34 of Group 1 have opposite optical powers to provide for color correction of the system 30. Sub-group 1 of Group 2 also has lens elements (36 and 38) with opposite optical powers to provide for color correction of the system 30.

As can be seen, Sub-group 1 has a strong negative surface (on lens 38) closet to the image plane 42 and Sub-group 2 is separated from Sub-group 1, in part to extend the distance to the exit pupil.

The strong negative surface power of Sub-group 1 provides a telephoto effect, thus minimizing the total lens system length. Because of the negative power and attendant contribution to Petzval curvature of Sub-group 1, Sub-group 2 can be added to provide for the desired exit pupil position while still maintaining a flat image surface.

A five-element zoom lens system is described in U.S. Pat. No. 7,061,685 (Itoh), where the effective focal length of Group 1 is −2.038, the effective focal length of Sub-group 1 is 1.982, and the effective focal length of Sub-group 2 is 2.758. The thickness of Sub-group 1 is 0.56 times the focal length of the system. The first principal point (PP1) of Sub-group 1 is −0.587. The absolute value of PP1 for Sub-group 1 divided by the focal length of Sub-group 1 is 0.296. A comparison of the systems 10 and 30 in this patent application to those of Itoh reveals that the focal length of Sub-group 1 of Itoh is significantly larger, while the absolute value of PP1 for Sub-group 1 divided by the focal length of Sub-group 1 of Itoh is significantly smaller. In addition, the thickness of Sub-group 1 is much smaller—0.56 times the focal length of the system, as compared to greater than 0.6 times, greater than 0.9 times, and greater than 0.94 times the focal length of the system as exemplified by system 10 which is approximately 0.94 times the focal length of the system and system 30 which is approximately 1.03 times the focal length of the system and system 30. Further the Itoh system only has a zoom ratio of 1.91 to 1 as compared to approximately 2.8 or roughly 3 to 1 for systems 10 and 30. Thus, the Itoh system achieves a lesser zoom range while being less compact than systems 10 and 30.

As can be appreciated by achieving a 3:1 zoom range with only five lens elements the systems 10 and 30 can be inexpensively manufactured. Further, with the novel combination of lens elements, particularly the thickness and power of lens element 18 in system 10 and lens element 38 in system 30, the total length of the systems 10 and 30 can be kept small. The invention can be modified for various manufacturing technologies as yet unexplored. It may also be modified for increased relative aperture or for a larger zoom range, also unexplored.

It will be understood that the lens elements of systems 10 and 30 could be composed of any suitable optically transparent material, such as glass or plastic.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A zoom lens system, comprising:
   a first lens group having a negative power and including two lens elements;
   a second lens group having a positive power and including three lens elements, the three lens elements having a first lens element having a positive power, a second lens element having a negative power, and a third lens element having a positive power, wherein the first and second lens elements of the second lens group form a first sub-group and the first sub-group has an effective focal length between 1.0 and 1.5;
   wherein the first lens group can be moved relative to the second lens group to move through a range of focal lengths to achieve a zoom ratio of at least approximately 2.8.

2. A zoom lens system as defined in claim 1, wherein the first lens group includes a first lens element having a negative power and a second lens element having a positive power.

3. A zoom lens system as defined in claim 1, wherein the first and second lens elements of the second lens group together have a focal length that is longer than the length of the lens group.

4. A zoom lens system as defined in claim 1, wherein the length from the first surface of the first lens element of the first lens group is spaced apart from the location of the image formed by the zoom lens system by a distance less than five times the shortest focal length of the system.

5. A zoom lens system as defined in claim 4, wherein the length from the first surface of the first lens element of the first lens group is spaced apart from the location of the image formed by the zoom lens system by a distance less than 4.1 times the shortest focal length of the system.

6. A zoom lens system as defined in claim 1, wherein the zoom lens system forms an image for an electronic image sensor that has an active area whose size can be represented by a diagonal thereof;
   wherein the length from the first surface of the first lens element of the first lens group is spaced apart from the image formed by the zoom lens system by a distance less than four times the diagonal of the active area of the electronic image sensor.

7. A zoom lens system as defined in claim 6, wherein the length from the first surface of the first lens element of the first lens group is spaced apart from the image formed by the zoom lens system by a distance less than 3.4 times the diagonal of the active area of the electronic image sensor.

8. A zoom lens system as defined in claim 1, wherein the third lens element in the second lens group remains stationary relative to the location of the image formed by the zoom lens system when the focal length of the system is varied.

9. A zoom lens system as defined in claim 1, wherein the third lens element in the second lens group remains stationary relative to the second lens element in the second lens group when the focal length of the system is varied.

10. A zoom lens system as defined in claim 1, wherein one or more of the lens elements in the zoom lens system are composed of glass.

11. A zoom lens system as defined in claim 1, wherein one or more of the lens elements in the zoom lens system are composed of a molded plastic.

12. A zoom lens system as defined in claim 1, wherein one or more of the lens elements in the zoom lens system has an aspheric surface.

13. A zoom lens system as defined in claim 1, wherein the second lens element in the second lens group has a thickness of at least 0.6 times the shortest focal length of the system.

14. A zoom lens system as defined in claim 1, wherein the first and second lens elements in the second lens group form a sub-group that has a thickness of at least 0.9 times the shortest focal length of the system.

15. A zoom lens system as defined in claim 1, wherein the first and second lens elements in the second lens group form a sub-group that has a thickness of at least 0.94 times the shortest focal length of the system.

16. A zoom lens system, comprising:
    a first lens group having a negative power and including two lens elements; and
    a second lens group having a positive power and including three lens elements in two sub-groups, a first sub-group having a first lens element having a positive power and a second lens element having a negative power, and the first sub-group having an overall thickness, and a second sub-group having a third lens element having a positive power, wherein the thickness of the first sub-group is at least 0.85 times the shortest focal length of the system;
    wherein the first lens group can be moved relative to the second lens group to move through a range of focal lengths to achieve a zoom ratio of at least approximately 2.8; and
    wherein the lens system includes five and no more than five lens elements.

17. A zoom lens system as defined in claim 16, wherein the first lens group includes a first lens element having a negative power and a second lens element having a positive power.

18. A zoom lens system as defined in claim 16, wherein the first sub-group has a focal length that is longer than the length of the first sub-group.

19. A zoom lens system as defined in claim 16, wherein the length from the first surface of the first lens element of the first lens group is spaced apart from the image formed by the zoom lens group by a distance less than five times the shortest focal length of the system.

20. A zoom lens system as defined in claim 19, wherein the length from the first surface of the first lens element of the first lens group is spaced apart from the image formed by the zoom lens group by a distance less than 4.1 times the shortest focal length of the system.

21. A zoom lens system as defined in claim 16, wherein the zoom lens system forms an image for an electronic image sensor that has an active area whose size can be represented by a diagonal thereof;
   wherein the length from the first surface of the first lens element of the first lens group is spaced apart from the image formed by the zoom lens system by a distance less than four times the diagonal of the active area of the electronic image sensor.

22. A zoom lens system as defined in claim 21, wherein the length from the first surface of the first lens element of the first lens group is spaced apart from the image formed by the zoom lens system by a distance less than 3.4 times the diagonal of the active area of the electronic image sensor.

23. A zoom lens system as defined in claim 16, wherein the third lens element in the second lens group remains stationary relative to the image formed by the zoom lens system when the focal length of the system is varied.

24. A zoom lens system as defined in claim 16, wherein the third lens element in the second lens group remains stationary relative to the second lens element in the second lens group when the focal length of the system is varied.

25. A zoom lens system as defined in claim 16, wherein one or more of the lens elements in the zoom lens system are composed of glass.

26. A zoom lens system as defined in claim 16, wherein one or more of the lens elements in the zoom lens system are composed of a molded plastic.

27. A zoom lens system as defined in claim 16, wherein one or more of the lens elements in the zoom lens system has an aspheric surface.

28. A zoom lens system as defined in claim 16, wherein the first sub-group has an effective focal length between 1.0 and 1.5.

29. A zoom lens system as defined in claim 16, wherein the first sub-group has a thickness of at least 0.9 times the shortest focal length of the system.

30. A zoom lens system as defined in claim 16, wherein the first sub-group has a thickness of at least 0.94 times the shortest focal length of the system.

\* \* \* \* \*